(12) United States Patent
Zeine

(10) Patent No.: US 10,038,253 B2
(45) Date of Patent: *Jul. 31, 2018

(54) HIGH DIELECTRIC ANTENNA ARRAY

(71) Applicant: Ossia Inc., Bellevue, WA (US)

(72) Inventor: Hatem Zeine, Bellevue, WA (US)

(73) Assignee: Ossia Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,987

(22) Filed: May 15, 2017

(65) Prior Publication Data

US 2017/0250474 A1   Aug. 31, 2017

Related U.S. Application Data

(63) Continuation of application No. 14/461,332, filed on Aug. 15, 2014, now Pat. No. 9,685,711, which is a continuation-in-part of application No. 14/171,750, filed on Feb. 3, 2014, now Pat. No. 9,553,473.

(60) Provisional application No. 61/867,001, filed on Aug. 16, 2013, provisional application No. 61/760,648, filed on Feb. 4, 2013.

(51) Int. Cl.
| | |
|---|---|
| *H01Q 19/06* | (2006.01) |
| *H01Q 21/28* | (2006.01) |
| *H01Q 19/09* | (2006.01) |
| *H01Q 21/00* | (2006.01) |
| *H04B 5/00* | (2006.01) |
| *H01Q 21/22* | (2006.01) |
| *H02J 50/20* | (2016.01) |
| *H02J 17/00* | (2006.01) |

(52) U.S. Cl.
CPC ............. *H01Q 21/28* (2013.01); *H01Q 19/09* (2013.01); *H01Q 21/0087* (2013.01); *H01Q 21/22* (2013.01); *H04B 5/0031* (2013.01); *H04B 5/0037* (2013.01); *H02J 17/00* (2013.01); *H02J 50/20* (2016.02); *Y10T 29/49018* (2015.01)

(58) Field of Classification Search
CPC ........ H01Q 19/06; H01Q 21/28; H01Q 21/22; H01Q 19/09
USPC .................................................. 343/753, 909
See application file for complete search history.

(56) References Cited

U.S. PATENT DOCUMENTS

| | | | |
|---|---|---|---|
| 4,641,140 | A | 2/1987 | Heckaman et al. |
| 6,952,456 | B1 | 10/2005 | Aiello et al. |
| 6,965,355 | B1 | 11/2005 | Durham et al. |
| 7,083,104 | B1 | 8/2006 | Empedocles et al. |
| 7,088,306 | B2 | 8/2006 | Chiang et al. |
| 8,159,364 | B2 | 4/2012 | Zeine |

(Continued)

OTHER PUBLICATIONS

International Application No. PCT/US2014/014736, International Search Report & Written Opinion, 8 pages, dated May 23, 2014.

(Continued)

*Primary Examiner* — Huedung Mancuso

(57) ABSTRACT

A system and method for wirelessly transmitting signals via antenna phased array. In order to decrease the distance between individual antennae in the array, the antennae are submersed in a high dielectric material in addition to being arranged at right angles to one another, both features precluding one or more antennae from coupling. Furthermore, wires are covered in high dielectric material in order to refract RF signals around them, allowing antennae towards the center of the array to successfully transmit signals past other layers.

20 Claims, 9 Drawing Sheets

(56) References Cited

U.S. PATENT DOCUMENTS

| | | |
|---|---|---|
| 2004/0201526 A1 | 10/2004 | Knowles et al. |
| 2005/0057431 A1 | 3/2005 | Brown et al. |
| 2008/0258981 A1* | 10/2008 | Achour ................ H01Q 21/065 343/702 |
| 2009/0033280 A1 | 2/2009 | Choi et al. |
| 2009/0212265 A1 | 8/2009 | Steinhardt et al. |
| 2010/0315045 A1 | 12/2010 | Zeine |
| 2011/0115303 A1 | 5/2011 | Baarman et al. |
| 2011/0115431 A1 | 5/2011 | Dunworth et al. |
| 2011/0304409 A1 | 12/2011 | Tamura |
| 2012/0025622 A1 | 2/2012 | Kim et al. |
| 2012/0112692 A1 | 5/2012 | Arai |
| 2012/0139780 A1 | 6/2012 | Wang et al. |
| 2012/0300875 A1 | 11/2012 | Kwon et al. |
| 2014/0217967 A1 | 8/2014 | Zeine et al. |
| 2015/0214615 A1* | 7/2015 | Patel ........................ H01Q 3/36 342/372 |

OTHER PUBLICATIONS

International Application No. PCT/US2014/051382, International Search Report & Written Opinion, 7 pages, dated Dec. 2, 2014.

\* cited by examiner (a)

(b)

Quasicrystal Antenna Layout

HIGH DIELECTRIC ANTENNA ARRAY

CROSS-REFERENCE TO RELATED APPLICATION(S)

This application is a continuation of U.S. patent application Ser. No. 14/461,332, filed on Aug. 15, 2014, titled "High Dielectric Antenna Array," now allowed; which claims the benefit of U.S. Provisional Patent Application No. 61/867,001, filed on Aug. 16, 2013, titled "High Dielectric Antenna Array"; both of which are hereby fully incorporated in their entirety by this reference.

U.S. patent application Ser. No. 14/461,332 also claims the benefit of and is a continuation-in-part of U.S. patent application Ser. No. 14/171,750, filed on Feb. 3, 2014, titled "Systems And Methods For Optimally Delivering Pulsed Wireless Power," issued as U.S. Pat. No. 9,553,473 on Jan. 24, 2017; which claims the benefit of U.S. Provisional Patent Application No. 61/760,648, filed on Feb. 4, 2013, titled "Systems And Methods For Optimally Delivering Pulsed Wireless Power"; both of which are hereby fully incorporated in their entirety by this reference.

TECHNICAL FIELD

This invention relates generally to the field of wireless signal transmission, and more specifically a new and useful system and method for engineering antenna arrays.

BACKGROUND

Many useful applications are based on the transmission of wireless pulses. Examples include radar detection using transmitted and reflected pulsed microwave signals as well as medical ablation procedures that use pulsed microwave to ablate targeted body tissues.

The U.S. patent application Ser. No. 14/171,750 filed on Feb. 3, 2014, for Ossia, Inc., which is hereby fully incorporated, covered a transmitter that optimizes the delivery of wireless power to a plurality of receivers. In transmitting power wirelessly, phased array transmitters are used to direct the Radio Frequency (RF) power.

The transmission efficiency of a phased array transmitter is proportional to the number of antennae in the array. To transmit at high efficiency using, for example, a 2.4 GHz signal at a distance of 5 meters, one would theoretically need about 1 million antennae in the array to reach efficiencies greater than 90%. However, placing 1 million antennae within more or less the same distance of 5 meters from the target is a challenge. Each antenna needs its own volume of space to prevent it from directly coupling with neighboring antennae, and therefore, the size of the array could become several times larger than the 5-meter distance. Moreover, the efficiency would also disappear as the array would grow and most of the antennae would be outside the 5-meter range. As such, there is a need for a means of decreasing the size of an array while overcoming the constraints induced by antennae proximity.

A means of decreasing the size of an array while overcoming the constraints induced by antennae proximity is incorporated in the embodiments of this invention.

SUMMARY

In accordance with the present invention, a means of decreasing the size of an array while overcoming the constraints induced by antennae proximity is provided. In order to decrease the distance between individual antennae in the array, the antennae are submersed in a high dielectric material in addition to being arranged at right angles to one another, both features precluding one or more antennae from coupling. Furthermore, wires are covered in high dielectric material in order to refract RF signals around them, allowing antennae towards the center of the array to successfully transmit signals past layers above them.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The size of a phased array antenna is directly proportional to spacing between elements in the phased array. The spacing between these elements is dictated by the physics involved in radio frequency (RF) transmission in the material where the antenna elements are submersed, resulting in limits to how closely antennae can be placed together.

In the simplest case, two antennae facing each other can be placed only as closely as one wavelength apart. Any closer than that, and various unwanted side effects due to close proximity become significant and destroy the advantages of having two antennae. One of these effects causes the two antennae to act as one, which is counterproductive since the capability of directing wireless signals by a phased array antenna depends upon having unique phases assigned to individual antenna elements. The antenna phases are expected to be carefully controlled and distinct from one another. So, the minimum distance between antenna array elements sets the minimum size of the array.

Figure 1:
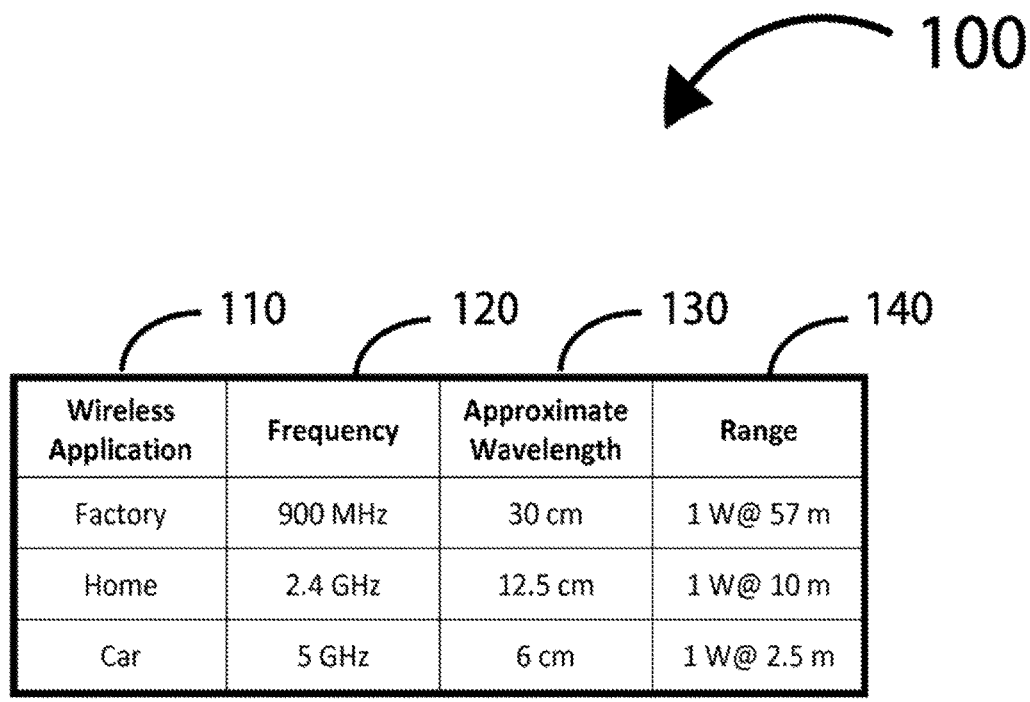
FIG. 1 features a table that displays different frequencies and corresponding wavelengths and transmission ranges for various wireless applications.

Since the minimum distance between antenna elements is directly related to wavelength and the wavelength is the inversely proportion to frequency, we can determine the size of the antenna array by knowing the frequency being transmitted and the medium in which the antenna elements are submersed. There are several possible implementations of wireless signals, each with a preferred frequency, as illustrated in FIG. 1. The chart 100 describes antenna elements used in different wireless applications 110. Frequencies 120 are the commonly used frequencies in conjunction with the wireless applications 110. Wavelengths 130 are approximate wavelength values, in vacuum or air, associated to the frequencies 120. Corresponding transmission ranges 140 are listed for wireless applications 110 when each is transmitting one Watt of power.

Within the home or business establishments, the frequencies of wireless signals range from 1 GHz to 8 GHz. One common frequency used is 2.4 GHz which corresponds to a wavelength of 12.5 cm in vacuum, or air, as shown in the chart 100, in FIG. 1. If, for example the number of antenna elements on a side of a cube-shaped phased array is 40, and at this common frequency, thus the length of each side of this cube would be about 16 feet (12.5 cm*40=5 m). This is truly a home-sized array. However, there is no room for the home inside this giant cube, since the array must have a population of antenna elements spaced about every 5 inches apart in all three dimensions. Hence, a way must be found to decrease the distance between antenna elements and still preserve the advantageous properties of the array.

The distances involved in the above calculations are based the electromagnetic wavelengths in vacuum, or air. The important factor in these distance calculations has to do with the permittivity of free space. If we can change the permittivity of the material that makes up the volume of the antenna array, we can affect the distances involved while holding the frequencies constant. This is due to the reduced speed of electromagnetic waves in a dielectric medium which normally has a permittivity factor larger than that of vacuum or air because of the higher dielectric constant of the dielectric medium.

However, the dielectric medium must be chosen with care since there are many other side effects different materials can introduce. Metals, for instance, can have advantageously high dielectric constants. However, metals also bring along many undesired attributes that conflict with the application at hand. Metals reflect radio frequencies (RF), and can absorb RF radiation and convert it to heat. Metals are also used to build transmitting/receiving antennae by being configured into various shapes and thus cannot be used as the medium in which the antenna elements are submersed.

There are other classes of materials with promisingly high dielectric coefficients, but they have other problems, such as the attenuation of RF energies passing through them. High weight can be another problem. These properties are also not desired in this application.

Figure 2:
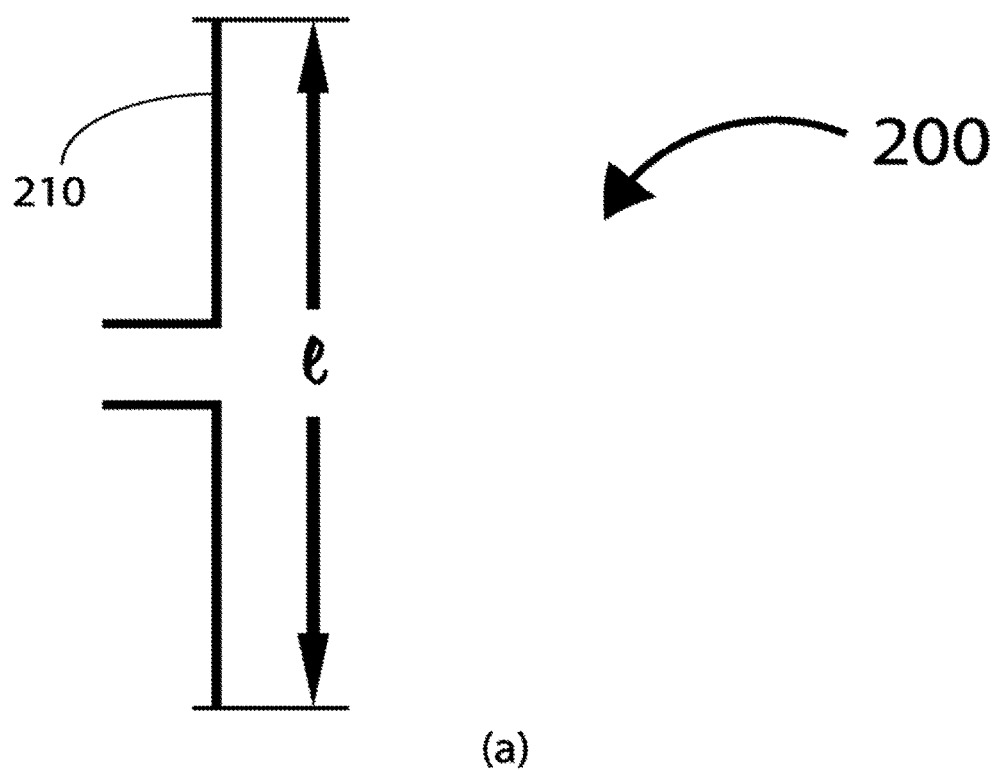
FIG. 2 shows a size comparison between an antenna in air and a noticeably smaller antenna submerged in a high-dielectric material.
Figure 2:
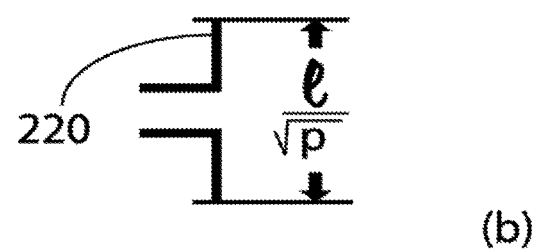

However, there is a class of materials having desirable coefficients and none of the drawbacks in the realm of physics; some can even be obtained without prohibitive expense. These are the Rogers materials, from which are made FR4 fiberglass circuit boards (and other products). These materials have permittivity coefficients in the range of p=3 to p=30. A coefficient of p=30 means that the distance terms (wavelengths 130 and transmission ranges 140) in the chart 100 of FIG. 1 can be reduced by a factor of $\sqrt{30}$, again at the same frequencies 120 in the chart 100. This reduction in size is illustrated in FIG. 2. As an example, we consider the effect of material permittivity coefficient, p on a quarter-wavelength antennae system 200. A quarter-wavelength antenna 210 is shown in FIG. 2(a). The quarter-wavelength antenna 210 is in air and has a length l. A quarter-wavelength antenna 220 is shown in FIG. 2(b), where the material used has a permittivity coefficient, p. The length of the quarter-wavelength antenna 220 is reduced by a factor $1/\sqrt{p}$.

If we now consider a cube-shaped array with 40 elements, immersed in a medium with a permittivity coefficient=30, made of the quarter-wavelength antennae system 200 above, reducing this cube in size by a factor of $\sqrt{30}$ in each of three dimensions results in a new cube of about 36 inches along the height, width, and depth. The actual new calculation is (12.5 cm*40/$\sqrt{30}$=0.91 m=35.9 inches) resulting in a cube less than 36 inches along each edge. Further, if we consider that tight packing of antennae could be as close as half-wavelengths, we can halve this number to 18 inches.

Figure 3:
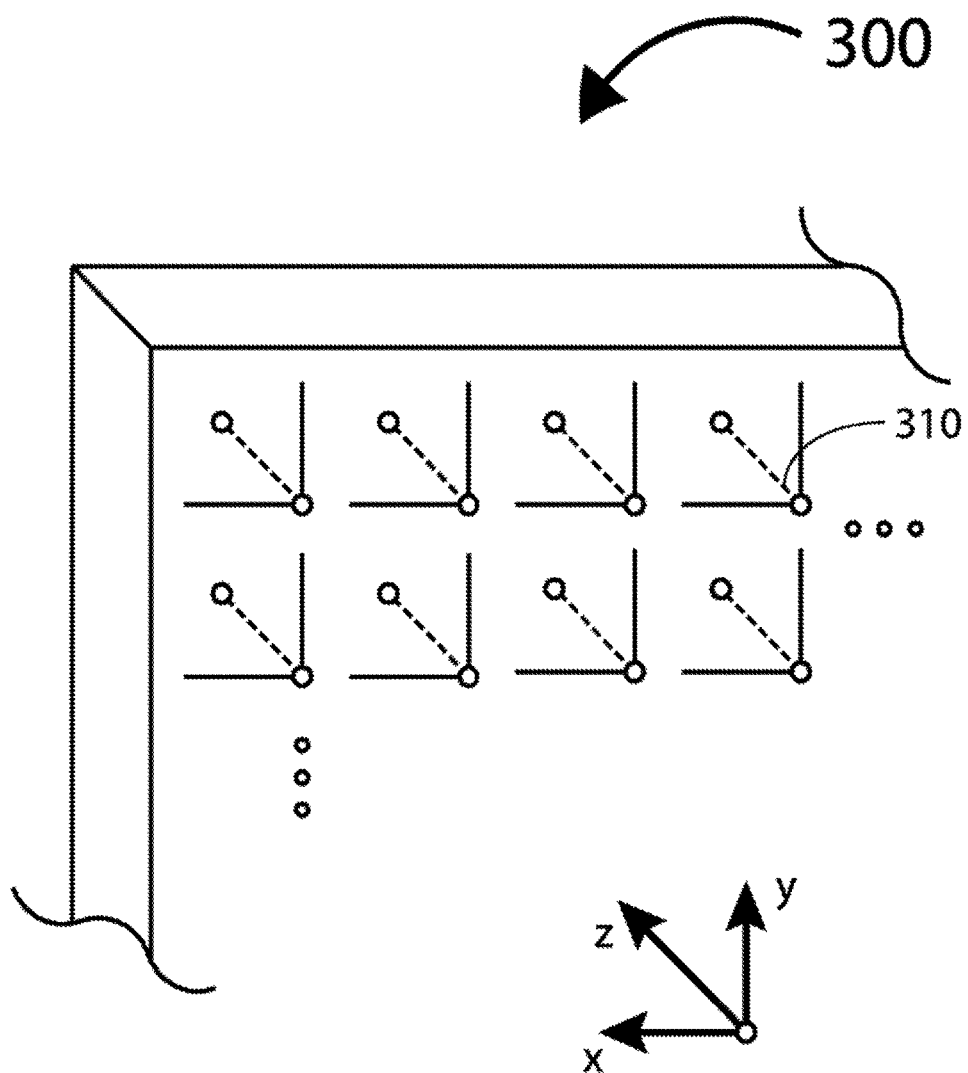
FIG. 3 shows the arrangement of antennae on a printed circuit board (PCB), wherein some components of the said antennae are represented by dashed lines going through the board from front surface to back surface and laid in three dimensions in order to cover every type of polarized signal.

In order for a large quantity of antennae to fit within this cube, one embodiment of the invention calls for a specific arrangement of them on a printed circuit board (PCB). In this arrangement, the antennae are laid down in three dimensions to cover every type of polarized signal, as shown in the antennae arrangement 300 depicted in FIG. 3. Components of the said antennae going through the board from front surface to back surface 310 are represented by dashed lines. This antennae arrangement 300 would allow a large quantity of antennae to be arranged in close proximity while minimizing the interference with one another.

Figure 4A:
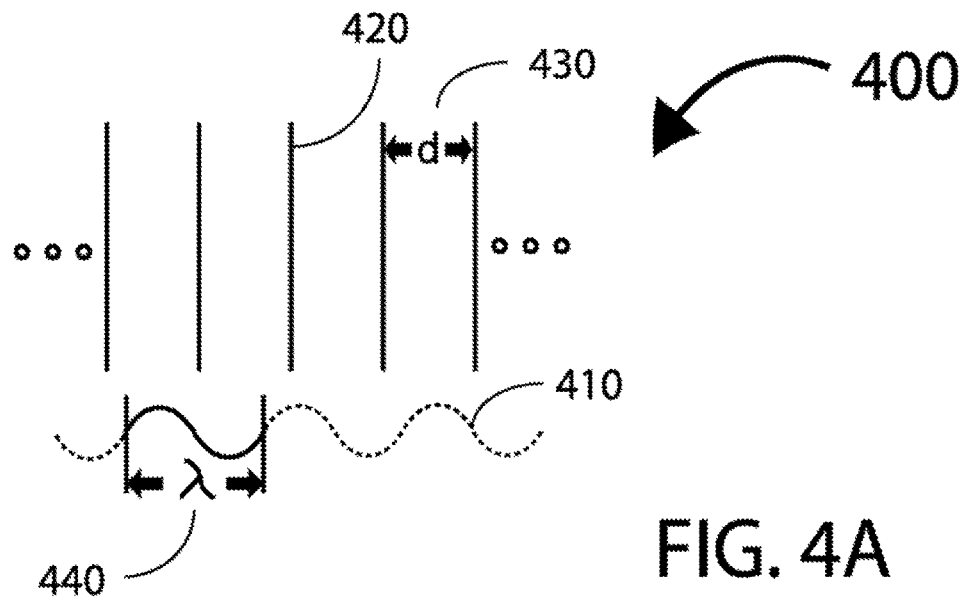
FIG. 4A shows the density of wires required to block a polarization of RF radiation in air.

FIG. 4A depicts how polarization RF radiation can be blocked if its "waves" 410 are intercepted by conductive wires 420 with spacing 430 of a length d equal to the RF radiation wavelength 440 or shorter, assuming the wave polarization is perpendicular to the orientation of the wires.

Figure 4B:
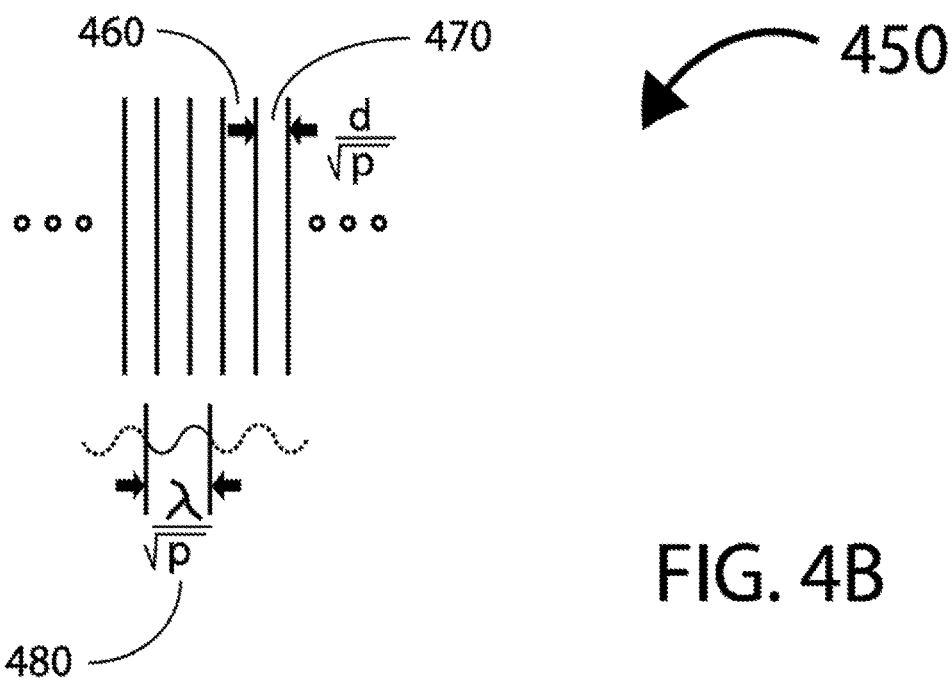
FIG. 4B shows the density of wires required to block the polarization of RF radiation when the said wires are immersed in a dielectric of permittivity coefficient p.

According to an embodiment of the invention, if the wires 460 are immersed in a dielectric of permittivity coefficient p, the spacing 470 is now reduced to $d/\sqrt{p}$, allowing for denser spacing of lines as shown in FIG. 4B. Thus decreasing the minimum size of the array unit overall.

As such and given the size constraints of the array, one embodiment of the invention recommends the submersion of the wires feeding and controlling circuitry on the PCB in a dielectric material of permittivity coefficient p, where p is substantially larger than 1.

Figure 5:
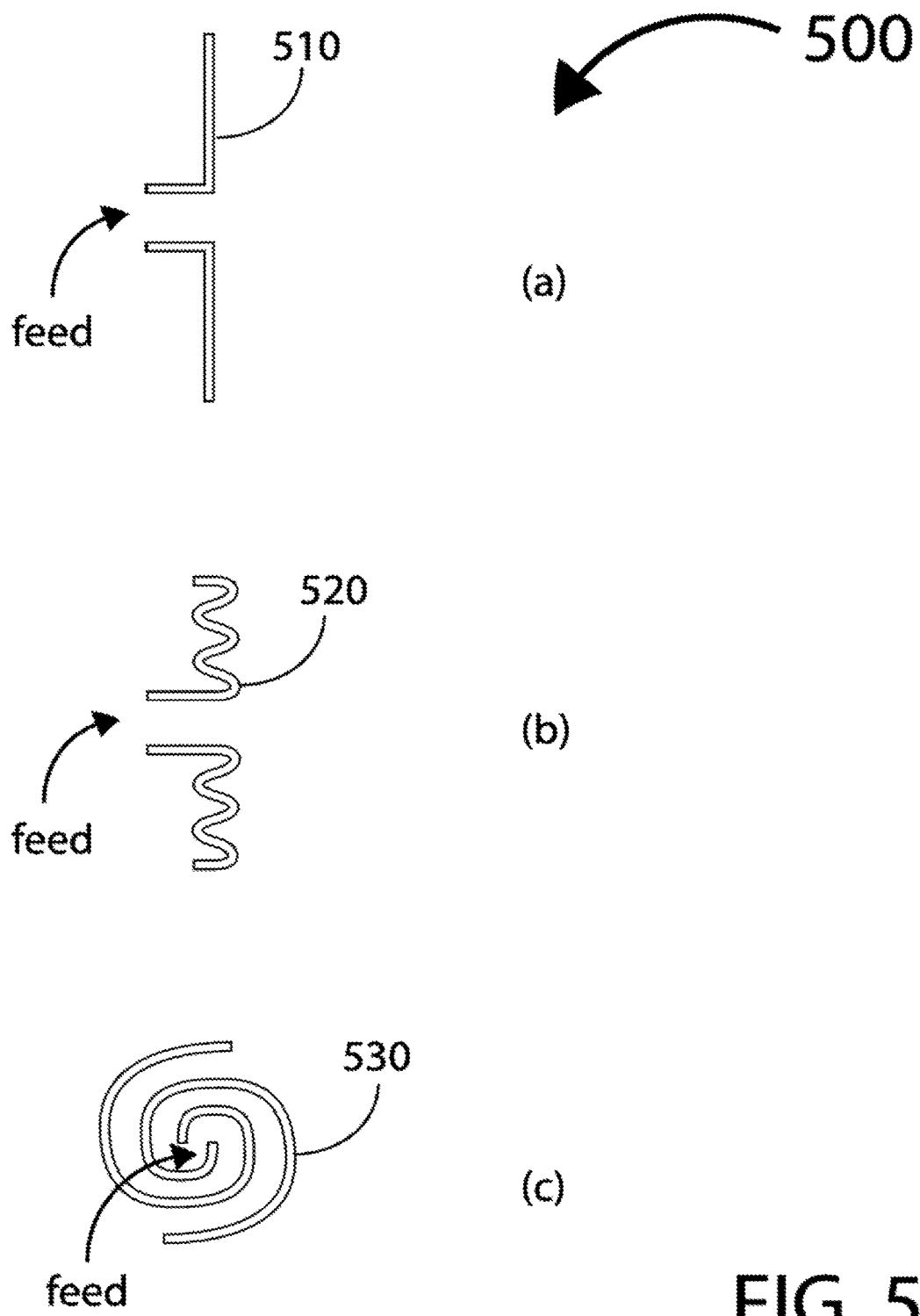
FIG. 5 shows exemplar dipole antennae having been etched using the same technique that etches the conductive traces on PCB.

As shown in FIG. 5, one embodiment of the invention has antennae 500 on a PCB etched using the same technique that etches conductive traces on the PCB, and thus allowing the antennae to be built into the board with no components added, and hence reducing the cost of producing the antennae. Patterns 510, 520, and 530 are exemplar dipole antennae that can be easily built on a PCB according to this embodiment of the invention.

Figure 6:
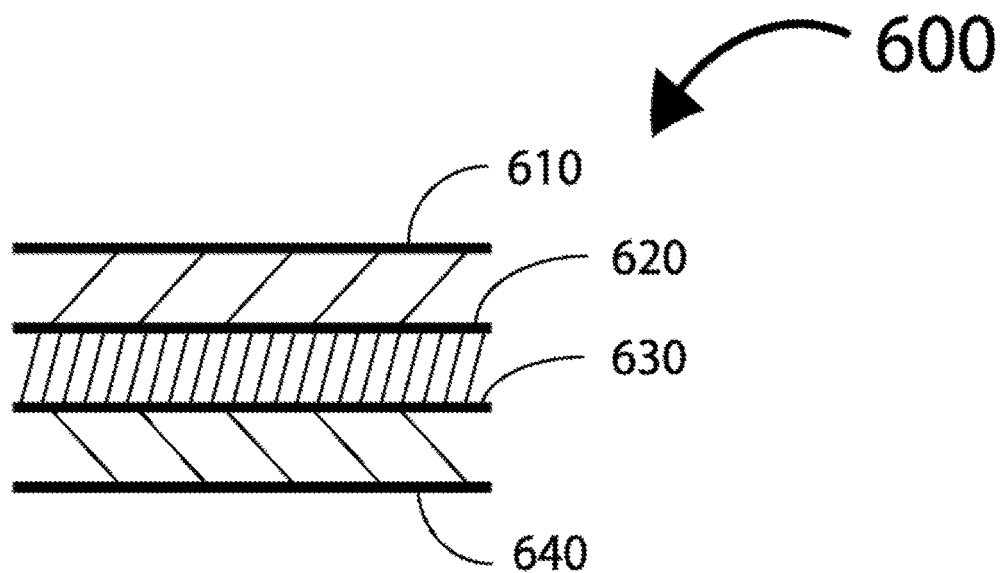
FIG. 6 shows a cross section of a PCB with four layers, the middle two layers being used to etch the antennae so as to have them immersed in the dielectric materials of the PCB.

As shown in FIG. 6, one embodiment of the invention, in the configuration 600, uses the internal layers 610, 620, 630, 640 of a PCB with multiple layers to etch antennae in order to ensure that said antennae would be fully immersed in the dielectric materials of the said PCB.

Figure 7:
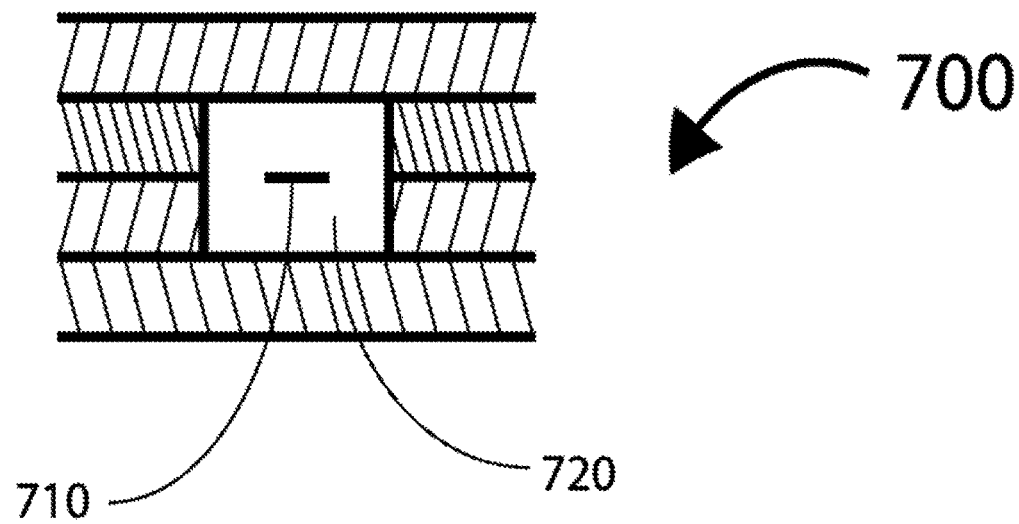
FIG. 7 shows a cross section of a PCB where the internal layers of the PCB host a conductive wire surrounded by air or some other low-permittivity material.

FIG. 7 shows an almost invisible trace 710 within the PCB material that are surrounded by a gap 720 of air or some other low-permittivity materials, thus making them highly reflective spaces, which is useful since traversing high- to low-permittivity materials means that most signals would be reflected at the boundary.

Figure 8A:
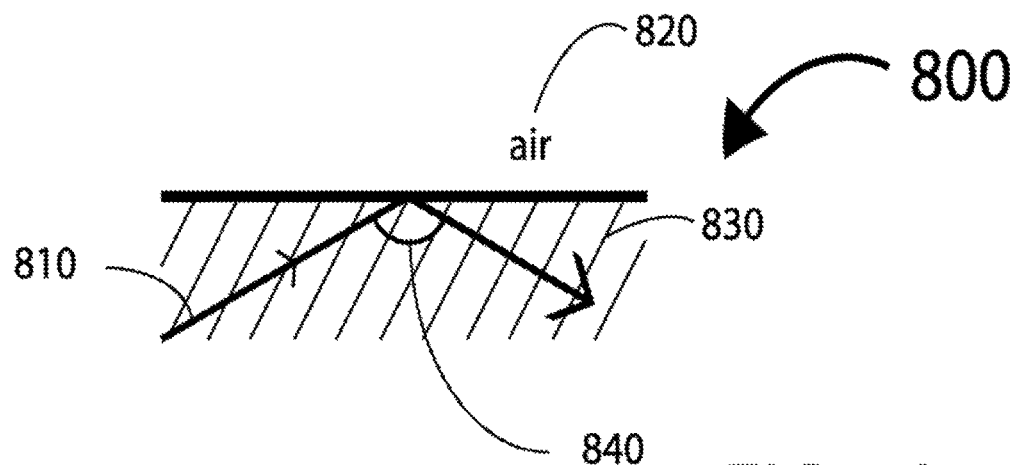
FIG. 8A shows a signal facing air as it leaves a high-dielectric material and exhibiting a high total internal reflection angle that causes signals to stay within the material.

As shown in FIG. 8A, a signal 810 facing a low-permittivity medium 820 such as air and leaving a high dielectric material 830 will exhibit a high total internal reflection angle 840, causing the signal to stay within the material 830, which is undesirable for an antennae array.

Figure 8B:
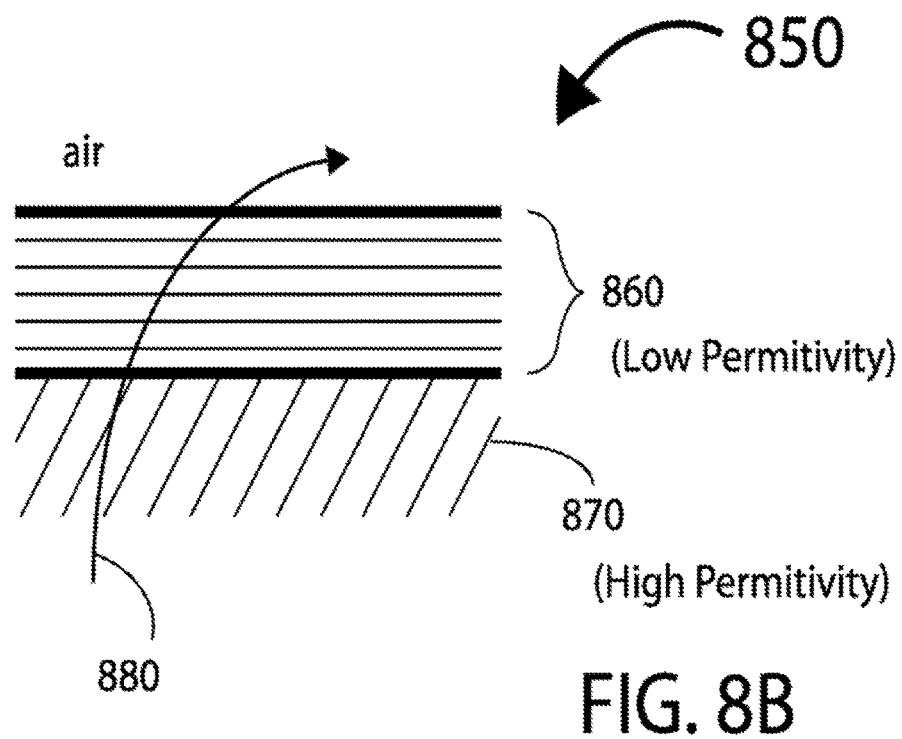
FIG. 8B shows the high dielectric material with several layers of slightly lower permittivity, causing internal signals to escape from the high-dielectric material to the air without having to face the high total internal reflection angle, a technique similar to optic lens coating.

In order to avoid this problem, an embodiment of the invention includes configuration 850 shown in FIG. 8B. In this configuration, outer layers of a PCB are made of a material 860 of a permittivity lower than that of the inner layers 870 which is made of high dielectric material. This causes internal signals 880 to escape from the high dielectric material 870 to the air without having to face the high total internal reflection angle, similar to optic lens coating.

Further reductions can be realized when one considers that antenna pairs at right angles to one another do not interfere. This permits five antennae to be placed into the same volume as one could with aligned antennae.

These right-angle orientations also have the advantageous effect of being able to deliver signals to a client device in any orientation in any of the three dimensions. With this invention, any angle can be used for orienting the antennae.

Figure 9:
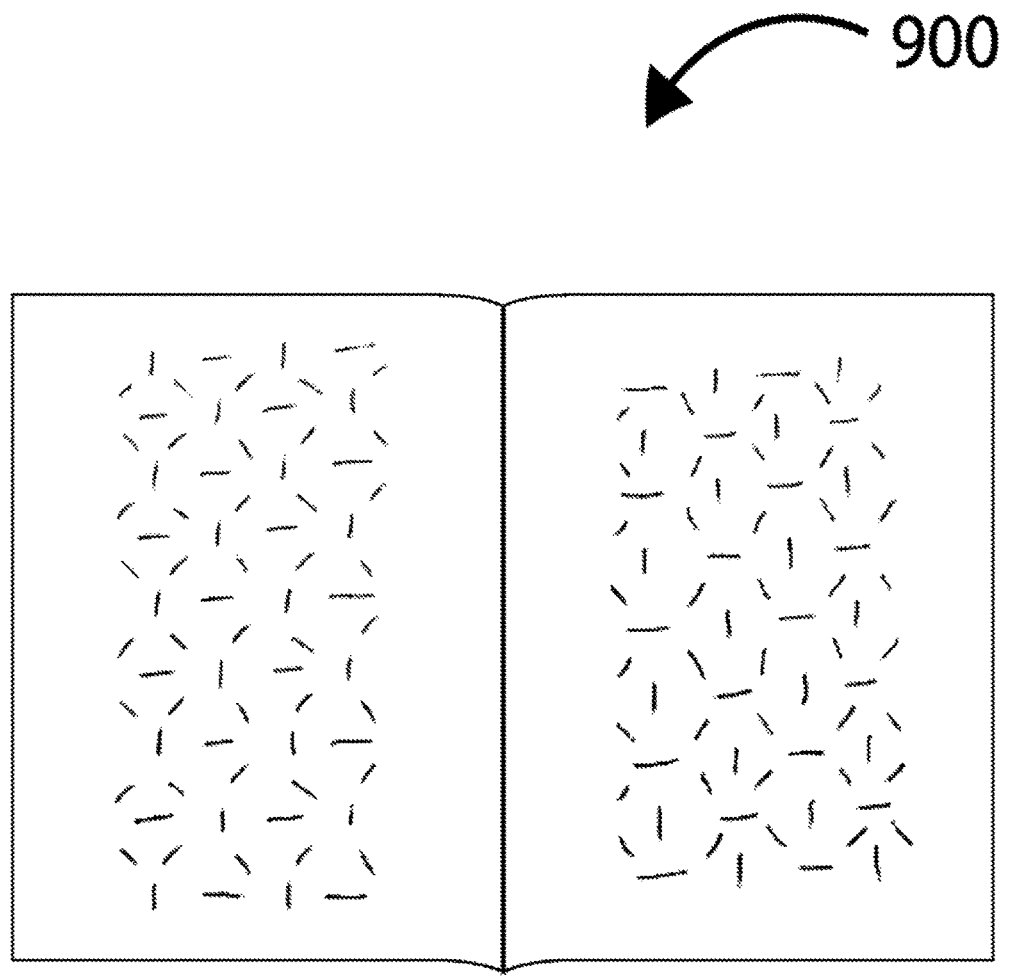
FIG. 9 illustrates antennae at a right-angle orientation in accordance with a preferred embodiment of the invention.

As illustrated in FIG. 9, even 45-degree orientations 900 can work, with the two figured patterns able to be overlaid upon one another. Not only do these patterns have antennae at 45-degree layouts, the two patterns can be placed one above another on alternate layers and the two arrays of antennae will be at right angles to one another.

With many antennae in close proximity to one another, all attempting to send RF signals out in various directions, it should be easy to imagine antennae near the center of the cubical array being unable to have an unobstructed path for sending a signal to a client device outside the array. After all, the number of other antennae is considerable—one embodiment of the invention would have over 150 other layers of antennae in the path from the center of a million-antenna array—and the signal has to avoid not only all the other antennae on the outgoing trip, but also the substantial power and ground wiring that supplies those antennae circuits.

What is needed is a way to make RF signals, which travel in straight lines, curve around all the other wiring enough to miss it all on the way out. Wires can be repeatedly coated with increasingly high dielectric materials in a manner similar to making candles. Just as light can be bent by glass, RF signal paths can be bent by high dielectric materials. If RF is refracted enough through the interfaces between each layer of a wire coated with ever-higher dielectric materials, the RF signal from any antenna will be routed around the wire inside. This would allow the array to be powered by wires that were essentially "invisible" to the RF passing through them.

This is improved upon by creating some traces within the PCB material that are surrounded by gaps of air or some other low-permittivity materials, making it possible to make traces within the board to be highly reflective spaces, as in the example shown in FIG. 7. This traversing of the signals from high- to low-permittivity materials means that most signals would be reflected at the boundary and thus they traverse around potentially interfering objects such as wires. This might affect the ability of antennae to receive signals, since only those signals aimed directly at the center of the wire will not be deflected around the antenna lead.

Figure 10:
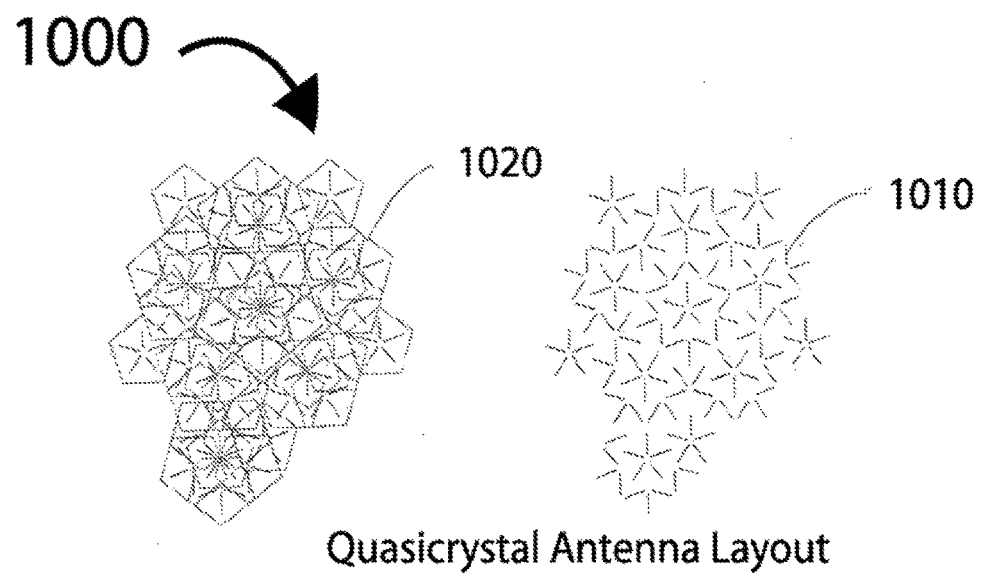
FIG. 10 shows a quasi-crystalline arrangement of the antennae.

As shown in FIG. 10, a preferred embodiment of the invention further recommends that the antennae in an array 1000 be arranged in a quasi-crystalline manner 1010 that provides aperiodic (i.e., non-repetitive) structure in all directions. The image 1020 shows every collection of five antennae encased in a pentagon, illustrating the aperiodic nature of this arrangement. This aperiodic design maintains antenna density throughout the array's layout, while at the same time preventing antennae from coupling as a result of being too close to one another. Furthermore, such aperiodic design suppresses the natural directivity of phased arrays, allowing for greater power delivery in any direction by suppressing natural (i.e., unwanted) directions.

Although the said quasi-crystalline arrangement would be aperiodic, having several arrangements of the same design in layers would nonetheless create periodic directions, which is detrimental to signal amplification. To avoid this problem, a preferred embodiment of the invention would have each layer of the array made from a different section of quasi-crystal design, thus avoiding identical stacked patterns throughout the layers.

Another issue is that the center of quasi-crystalline designs is usually symmetric around a certain angle, which compromises the aperiodicity of their patterns. To avoid this problem, an embodiment of the invention calls for using those parts of the quasi-crystalline design that are farther from the center.

Figure 11:
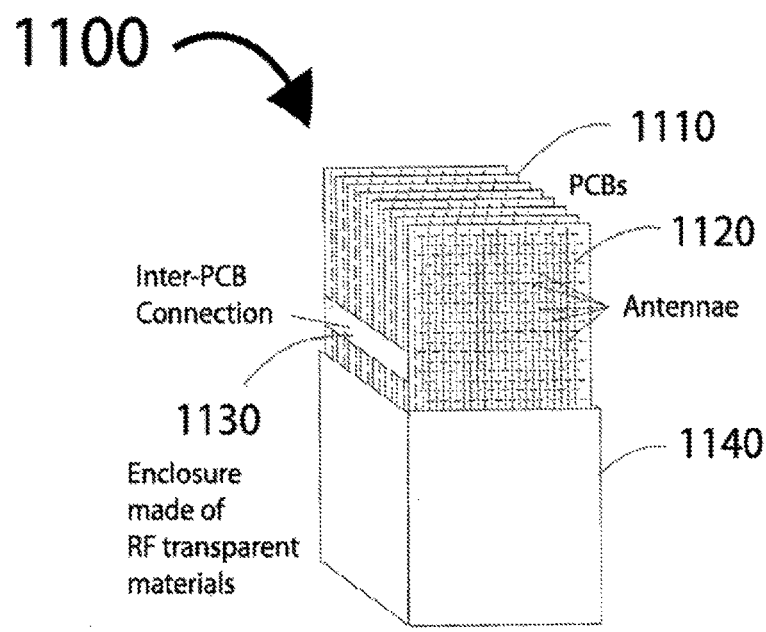
FIG. 11 depicts a preferred embodiment of the entire system of this invention.

FIG. 11 shows a preferred embodiment of entire system 1100 of this invention. The system appears as a three-dimensional form comprising a plurality of PCBs 1110, each PCB comprising high-dielectric material encasing an array of densely packed antennae 1120, the antennae being oriented in angular positions with respect to each other, the antennae further being arranged in a quasi-crystalline pattern. The PCBs are electrically joined by inter-PCB connection comprising wire 1130 encased in high-dielectric material. The PCBs are enclosed in an enclosure 1140 which is made of a material that is transparent to RF so as not to interfere with signal transfer. The said enclosure can be made of a material having a permittivity lower than that of the PCBs.

In sum, the present invention provides a system and methods for reducing the size of an antenna phased array without compromising the range of its wireless signal transmission. The wireless signal may comprise power, data, or any other signal capable of being transmitted wirelessly. The advantages of such a system include the ability to store phased arrays in smaller spaces, thus making wireless signal transmission available in a wider range of scenarios, such as in the home or automobile.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

I claim:

1. A wireless power transmission system comprising:
    a plurality of antenna elements disposed on multiple layers and arranged in a substantially right-angle configuration relative to each other; and
    a dielectric insulator that substantially immerses the plurality of antenna elements and increases wireless power transfer by allowing a subset of the plurality of antenna elements disposed on one or more layers of the multiple layers to transmit signals past other antenna elements disposed on outer layers of the multiple layers.

2. The wireless power transmission system of claim 1, wherein the dielectric insulator has a permittivity coefficient that is larger than three.

3. The wireless power transmission system of claim 1, wherein the antenna elements are coupled by conductive wires coated in a dielectric material of high permittivity.

4. The wireless power transmission system of claim 1, wherein the antenna elements include traces within a circuit board, and wherein at least one of the traces is surrounded by a low-permittivity dielectric material.

5. The wireless power transmission system of claim 1, wherein dielectric materials of high permittivity are placed in proximity to areas of lower permittivity materials to enhance signal transfer.

6. The wireless power transmission system of claim 1, wherein the antenna elements are etched into interstitial layers of a circuit board.

7. The wireless power transmission system of claim 1, wherein the antenna elements form one or more quasi-crystalline patterns.

8. A method for transmitting wireless power comprising:
    emitting wireless signals from antenna elements,
    wherein the antenna elements are disposed on multiple antenna layers and immersed by one or more high permittivity dielectric insulators, and
    wherein the antenna elements are arranged at substantially right-angles relative to each other; and
    refracting the wireless signals around wires coupling the antenna elements to improve signal transfer by allowing a subset of the array of antenna elements disposed on one or more layers of the multiple layers to transmit signals past other layers of the multiple layers.

9. The method of claim 8, wherein the antenna elements are immersed by a dielectric insulator having a permittivity coefficient that is larger than three.

10. The method of claim 9, wherein the antenna elements are coupled by conductive wires coated in a dielectric material of high permittivity.

11. The method of claim 10, wherein the antenna elements are comprised of traces within a circuit board, and wherein one or more of the traces are surrounded by a low-permittivity dielectric material.

12. The method of claim 10, wherein the dielectric material of high permittivity is proximate to areas of lower permittivity material for enhancing signal transfer.

13. The method of claim 10, wherein the antenna elements are etched into interstitial layers of a circuit board.

14. The method of claim 10, wherein the antenna elements form one or more quasi-crystalline patterns.

15. A wireless power transmission system comprising:
    an antenna array comprising multiple antenna layers each having multiple antenna elements disposed thereon, wherein the antenna elements are arranged in a substantially right-angle configuration relative to each other; and
    one or more high permittivity dielectric insulators that immerse the multiple antenna elements, wherein the one or more dielectric insulators are configured to increase wireless power transfer by allowing a subset of the plurality of antenna elements disposed on one or more layers of the multiple layers to transmit wireless signals past other antenna elements disposed on outer layers of the multiple layers.

16. The wireless power transmission system of claim 15, wherein the wireless signals comprise RF signals that refract around the other antenna elements disposed on the outer layers of the multiple layers to increase wireless power transfer.

17. The wireless power transmission system of claim 15, wherein the one or more dielectric insulators decrease spacing between each of the multiple antenna elements.

18. The wireless power transmission system of claim 15, wherein at least one of the one or more dielectric insulators has a permittivity coefficient that is larger than three.

19. The wireless power transmission system of claim 15, wherein the antenna elements are coupled by conductive wires coated in a dielectric material of high permittivity, and wherein the dielectric material of high permittivity is in proximity to areas of lower permittivity material for enhancing signal transfer.

20. The wireless power transmission system of claim 15, wherein the antenna elements are comprised of traces within a circuit board, and wherein at least a portion of the traces are surrounded by gaps of air or some other lower-permittivity dielectric material.

* * * * *